: 3,018,276
Patented Jan. 23, 1962

3,018,276
PROCESS FOR POLYMERIZING CHLOROTRIFLU-OROETHYLENE AND MIXTURES THEREOF WITH VINYLIDENE FLUORIDE
Selwyn Bandes, Hanover Township, Morris County, N.J., assignor to Allied Chemical Corporation, a corporation of New York
No Drawing. Filed Oct. 3, 1956, Ser. No. 613,612
9 Claims. (Cl. 260—87.7)

This invention relates to a process for polymerizing chlorotrifluoroethylene, alone or together with certain proportions of vinylidene fluoride, in the presence of an aqueous suspension medium.

Numerous processes are known for preparing polymeric chlorotrifluoroethylene or copolymers of chlorotrifluoroethylene and vinylidene fluoride by polymerization of the corresponding monomer or monomers in aqueous suspension medium. High polymeric yields are said to be obtained by carrying out the polymerization in aqueous suspension medium and in the presence of a redox catalyst, i.e. an oxidizing agent-reducing agent system such as a water-soluble persulfate oxidizing component and an oxidizable sulfoxy compound reducing component. In carrying out this reaction, the pH of the suspension medium has generally been maintained below a pH of 5 since it was found that above pH of 5 there was a drop in the rate of reaction and polymer yield. However, when a redox catalyst containing a water-soluble perphosphate as oxidizing agent was used under such acidic pH conditions, extremely low polymer yields were obtained. This result indicated that perphosphate redox catalysts were unsuitable in the polymerization of organic fluorine compounds.

I have now made the surprising discovery that chlorotrifluoroethylene and mixtures containing chlorotrifluoroethylene and up to about 50% by weight of vinylidene fluoride may be polymerized in aqueous suspension medium in the presence of a redox catalyst comprising a water-soluble perphosphate and a water-soluble reducing agent, while maintaining the aqueous suspension medium at an approximately neutral to slightly alkaline pH of 6.5 to 8.5, to produce excellent polymer yields; i.e., about 80% up to almost 100% yields of polymer are obtained.

As stated above, chlorotrifluoroethylene and mixtures containing chlorotrifluoroethylene and up to about 50% by weight of vinylidene fluoride may be utilized in the processes of this invention. Particularly suitable mixtures are those containing less than 10% by weight of vinylidene fluoride.

In the redox catalyst of the present invention the water-soluble perphosphate acts as a promoter and the water-soluble reducing agent as an activator.

Although any water-soluble perphosphate may be employed, such as the alkali metal (e.g. sodium and potassium) and ammonium perphosphates, I prefer to use an alkali metal perphosphate, and particularly, potassium perphosphate. Potassium perphosphate may be conveniently prepared by electrolysis of a solution containing the following salts: monopotassium phosphate, potassium hydroxide, potassium fluoride and potassium chromate (Fichter and Gutzwiller, Helv. Chem. Acta. 11, 323–27, 1928). The potassium perphosphate may be employed directly from the electrolyte solution (which also contains dipotassium phosphate, potassium orthophosphate, potassium fluoride and potassium chromate) or may be used as the salt itself. The salt is precipitated by reducing the volume of the electrolyte solution over a steam bath. Substantially pure (96 to 99%) salt is obtained by recrystallizing the salt several times from water.

The amount of water-soluble perphosphate employed in practice of the present invention may be varied within wide limits, for example, from about 0.1 to 5% by weight based on the weight of the monomer or monomers.

Any suitable water-soluble reducing agent may be used in preparing the redox catalyst of the present invention. For example, bisulfates (including metabisulfites), hydrosulfites, sulfides, thiosulfates, hydrazine and hydroxylamine may be employed. It has been found convenient to employ as reducing agent bisulfites or metabisulfites, and particularly the alkali metal salts. When a metabisulfite is used, it hydrolyzes immediately in the aqueous medium to the corresponding bisulfite.

The amount of the reducing agent may be varied considerably, for example, from about 0.05 to 5% by weight based on the weight of the monomer or monomers.

I have found it preferable that the perphosphate and reducing agent be employed in weight proportion of about 0.3 to 7.5 parts of perphosphate to one part of reducing agent.

The pH of the aqueous suspension medium must be maintained within the range of 6.5 to 8.5 in order to attain the desired results of the present invention. In order to achieve a pH within the indicated range when a substantially pure perphosphate is employed, it is generally necessary, depending upon the nature of the reducing agent used, to add a suitable basic material such as potassium hydroxide or a suitable acidic material such as phosphoric acid to the aqueous suspension medium. For example, when an acidic material such as a bisulfite or metabisulfite is employed as reducing agent with a substantially pure perphosphate, addition of a basic material is usually required to achieve the desired pH. However, when the potassium perphosphate-containing electrolyte solution produced according to the process of Fichter and Gutzwiller (supra) is used in conjunction with a bisulfite or metabisulfite, I have found that the solution, as produced, contains sufficient basic material, i.e. dipotassium perphosphate, to obtain the desired pH. The dipotassium perphosphate also acts as a buffering agent in aiding maintenance of the initially produced pH.

In preparing the suspension of monomer or monomers, the amount of water used may be varied within wide limits. Particularly efficacious operation is conducted by employing a weight ratio of about 2.5 to 4.0 parts of water per part of monomer or monomers.

The aqueous suspension reaction mixture must be strenuously agitated to maintain the monomer(s) and redox catalyst in intimate contact, thereby effecting a relatively fast rate of reaction. The vigorous agitation may be obtained by any conventional procedure.

During the polymerization process of the present invention, the reaction mixture may be maintained at temperatures in the range of about 0° to about 50° C., but it is especially advantageous to employ temperatures ranging from about 25° to about 35° C.

Since chlorotrifluoroethylene and vinylidene fluoride are gases at normal temperatures and pressures, it is advantageous to carry out the present process in a closed vessel under superatmospheric pressures. It has been found particularly suitable to carry out the process under the autogenous pressure of the reactants. Thus, in the case of chlorotrifluoroethylene, pressures varying from about 40 (at about 0° C.) to 90 (at about 50° C.) p.s.i.a. and in the case of mixtures of chlorotrifluoroethylene and vinylidene fluoride, pressures varying from about 40 (at about 0° C.) to 700 (at about 50° C.) p.s.i.a., are advantageously employed. However, it is not intended that the present invention be limited to these particular pressures since they are not critical, and higher or lower pressures may be employed.

The reaction time of the present invention may be varied depending on the monomeric system, rate of agitation, polymerization temperature, etc. Generally, polymerization times ranging from about 6 to 18 hours are sufficient to produce the high yields of the present invention.

The polymerization process of this invention may be carried out in either batchwise or continuous manner. Separation of the polymer may be accomplished by settling and decanting, by filtering, by evaporation or by any other suitable method.

The polymers and copolymers produced by the process of this invention are white thermoplastic solids of relatively high molecular weight which find use as metal coatings, electrical insulators, etc.

The following examples are illustrative of the present invention, but the invention is not to be considered as limited by the details of the examples. Proportions of materials are expressed in parts by weight.

In each of the examples the potassium perphosphate used was in the form of electrolyte solution produced by the process of Fichter and Gutzwiller (supra). The pH of this solution ranged from about 9.5 to 11.0

*Examples 1 to 3.*—Chlorotrifluoroethylene was polymerized in the following manner. Distilled water and a redox catalyst comprising potassium perphosphate and sodium metabisulfite were charged to a stainless steel closed reactor. The reactor was then quickly immersed in a bath of Dry Ice and acetone (at about −65° C.) and evacuated. The chlorotrifluoroethylene was condensed into the evacuated reactor, and the reactor was placed in an end over end agitator which was housed in a thermostated water bath. After the polymerization reaction was completed, chlorotrifluoroethylene polymer was recovered by venting off unreacted chlorotrifluoroethylene and discharging the polymer in water to a filter where the polymer was washed several times with hot water and filtered off. The polymer was then dried at about 130° C. in a filtered air circulating oven. The operating conditions and results of typical runs are set forth in Table I below:

*Examples 4 to 7.*—Mixtures of chlorotrifluoroethylene and vinylidene fluoride were polymerized as follows. Distilled water in which was dissolved a catalyst comprising potassium perphosphate and sodium metabisulfite was charged to a stainless steel, water-jacketed closed reactor supplied with an agitator having vertical motion. The reactor was then evacuated. The chlorotrifluoroethylene and vinylidene fluoride, in that order, were then condensed in a cylinder immersed in a bath (at −65° C.) of dry ice and acetone. The cylinder was then heated to about 60° C. and its contents charged to the evacuated reactor. After the polymerization reaction was completed, copolymer of chlorotrifluoroethylene and vinylidene fluoride was recovered by venting off unreacted chlorotrifluoroethylene and vinylidene fluoride and discharging the copolymer in water to a filter where the copolymer was washed several times with hot water and filtered off. The copolymer was then dried at about 100° C. in a filtered air circulating oven. The operating conditions and results of typical runs are set forth in Table II below:

*Table II*

| Ex. | Chlorotrifluoroethylene, Parts | Vinylidene Fluoride, Parts | H₂O, Parts | Potassium Perphosphate, Parts | Sodium Metabisulfite, Parts | pH | Time, Hours | Temperature, °C. | Yield | N.S.T., °C. |
|---|---|---|---|---|---|---|---|---|---|---|
| 4 | 386 | 20 | 1,500 | 2.8 | 1.9 | about 6.8 | 18 | 35 | 92 | 266 |
| 5 | 385 | 20 | 1,500 | 3.0 | 4.0 | 6.6 to 7.1 | 19 | 25 | 99 | 302 |
| 6 | 376 | 20 | 1,500 | 2.0 | 1.1 | 7.3 to 7.4 | 18 | 35 | 92 | 266 |
| 7 | 426 | 22.4 | 1,500 | 3.0 | 4.0 | 7.1 to 7.8 | 3½ | 26 | 82 | 280 |

*Example 8.*—A mixture containing approximately equal amounts of chlorotrifluoroethylene and vinylidene fluoride was polymerized in the following manner. Distilled water and a redox catalyst comprising potassium perhposphate and sodium metabisulfite were charged to a stainless steel closed reactor. The reactor was then quickly immersed in a bath of Dry Ice and acetone (at about −65° C.) and evacuated. The chlorotrifluoroethylene was condensed into the evacuated reactor, and the vinylidene fluoride was then added under autogenous pressure. The reactor was placed in an end over end agitator which was housed in a thermostated water bath. After the polymerization reaction was completed, copolymer of chlorotrifluoroethylene and vinylidene fluoride was recovered by venting off unreacted chlorotrifluoroethylene and vinylidene fluoride and discharging the copolymer in water to a filter where the copolymer was washed several times with hot water and filtered off. The copolymer was then dried at about 100° C. in a filtered air circulating oven. The operating conditions and results are given below:

| Ex. | Chlorotrifluoroethylene, Parts | Vinylidene Fluoride, Parts | H₂O, Parts | Potassium Perphosphate, Parts | Sodium Metabisulfite, Parts | pH | Time, Hours | Temperature, °C. | Yield, percent |
|---|---|---|---|---|---|---|---|---|---|
| 8 | 49 | 50 | 300 | 0.74 | 0.5 | 7.5 to 7.6 | 18 | 26 | 99 |

*Example 9.*—Chlorotrifluoroethylene was polymerized by the process described in Examples 1 to 3, while main-

*Table I*

| Ex. | Chlorotrifluoroethylene, Parts | H₂O, Parts | Potassium Perphosphate, Parts | Sodium Metabisulfite, Parts | pH | Time Hours | Temperature, °C. | Yield,[1] percent | N.S.T.,[2] °C. |
|---|---|---|---|---|---|---|---|---|---|
| 1 | 99 | 250 | 0.74 | 0.50 | 7.1 to 7.2 | 18 | 35 | 92 | 225 |
| 2 | 105 | 300 | 0.74 | 2.0 | 6.9 to 7.35 | 18 | 26 | 83 | 325 |
| 3 | 100 | 250 | 0.74 | 0.50 | 7.3 to 7.9 | 18 | 33 | 82 | 300 |

[1] Parts of polymer divided by parts of monomer fed.
[2] N.S.T. (no strength temperature)—a test used to provide an indication of relative molecular weight in accordance with the procedure outlined on pages 636, 638 and 641 of "Preparation, Properties and Technology of Fluorine and Organic Fluorine Compounds" by Slesser and Schram.

taining a highly acidic pH. The operating conditions and results are given below:

| Ex. | Chlorotri-fluoro-ethylene, Parts | H₂O, Parts | Potassium Perphosphate, Parts | Sodium Metabisulfite, Parts | pH | Time, Hours | Temperature, °C. | Yield, percent |
|---|---|---|---|---|---|---|---|---|
| 9 | 100 | 250 | 0.74 | 0.40 | 3.0 to 2.7 [1] | 18 | 25 | 1 |

[1] Phosphoric acid was initially added to the aqueous suspension medium in this run until a pH of 3.0 was obtained.

Thus, it is seen that when a highly acidic pH such as disclosed by the prior art was used in the present process for producing chlorotrifluoroethylene polymer, practically no yield was obtained.

*Examples 10 and 11.*—Mixtures of chlorotrifluoroethylene and vinylidene fluoride were polymerized by the process described in Example 8, while maintaining a highly acidic pH. The operating conditions and results are given below:

| Ex. | Chlorotri-fluoro-ethylene, Parts | Vinylidene Fluoride, Parts | H₂O, Parts | Potassium Perphosphate, Parts | Sodium Metabisulfite, Parts | pH | Time, Hours | Temperature, °C. | Yield, percent |
|---|---|---|---|---|---|---|---|---|---|
| 10 | 103 | 12 | 300 | 0.74 | 0.5 | 4.0 to 3.5 | 18 | 29 | 6 |
| 11 | 51 | 53 | 300 | 0.74 | 0.5 | 4.0 to 3.9 | 18 | 26 | 10 |

The above examples show that when the highly acidic pH taught by the prior art was used in the present process for producing copolymers containing chlorotrifluoroethylene and vinylidene fluoride, extremely low yields were obtained.

Use of a highly acidic medium in accordance with prior art procedures presents a serious problem of equipment corrosion, even of relatively acid-resistant, stainless steel equipment. On the other hand, the approximately neutral or slightly alkaline pH conditions of the present processes permit use of stainless steel equipment without any corrosion problem and, hence, substantially increase the life of the equipment.

Since various changes and modifications may be made in the invention without departing from the spirit thereof, the invention is deemed to be limited only by the scope of the appended claims.

I claim:

1. The process which comprises polymerizing a member of the group consisting of chlorotrifluoroethylene and mixtures containing chlorotrifluoroethylene and up to about 50% by weight of vinylidene fluoride in an aqueous suspension medium consisting essentially of water, a water-soluble perphosphate and a water-soluble reducing agent selected from the group consisting of bisulfites, hydrosulfites, sulfides, thiosulfates, hydrazine and hydroxylamine, at a temperature of about 0° to about 50° C. for a period of at least about 3½ hours, maintaining said aqueous suspension medium at a pH between 6.5 and 8.5 during the course of the polymerization, thereby producing a polymer in at least about 80% yield, and separating said polymer as product.

2. The process which comprises polymerizing a member of the group consisting of chlorotrifluoroethylene and mixtures containing chlorotrifluoroethylene and up to about 50% by weight of vinylidene fluoride in an aqueous suspension medium consisting essentially of water, an alkali metal perphosphate and a water-soluble reducing agent selected from the group consisting of bisulfites, hydrosulfites, sulfides, thiosulfates, hydrazine and hydroxylamine, at a temperature of about 0° to about 50° C. for a period of at least about 3½ hours, maintaining said aqueous suspension medium at a pH between 6.5 and 8.5 during the course of the polymerization, thereby producing a polymer in at least about 80% yield, and separating said polymer as product.

3. The process which comprises polymerizing a member of the group consisting of chlorotrifluoroethylene and mixtures containing chlorotrifluoroethylene and up to about 50% by weight of vinylidene fluoride in an aqueous suspension medium consisting essentially of water, potassium perphosphate and a water-soluble reducing agent selected from the group consisting of bisulfites, hydrosulfites, sulfides, thiosulfates, hydrazine and hydroxylamine, at a temperature of about 0° to about 50° C. for a period of at least about 3½ hours, maintaining said aqueous suspension medium at a pH between 6.5 and 8.5 during the course of the polymerization, thereby producing a polymer in at least about 80% yield, and separating said polymer as product.

4. The process which comprises polymerizing chlorotrifluoroethylene in an aqueous suspension medium consisting essentially of water, potassium perphosphate and a water-soluble reducing agent selected from the group consisting of bisulfites, hydrosulfites, sulfides, thiosulfates, hydrazine and hydroxylamine, at a temperature of about 0° to about 50° C. for a period of at least about 3½ hours, maintaining said aqueous suspension medium at a pH between 6.5 and 8.5 during the course of the polymerization, thereby producing a polymer in at least about 80% yield, and separating said polymer as product.

5. The process which comprises polymerizing a mixture containing chlorotrifluoroethylene and less than 10% by weight of vinylidene fluoride in an aqueous suspension medium consisting essentially of water, potassium perphosphate and a water-soluble reducing agent selected from the group consisting of bisulfites, hydrosulfites, sulfides, thiosulfates, hydrazine and hydroxylamine, at a temperature of about 0° to about 50° C. for a period of at least about 3½ hours, maintaining said aqueous suspension medium at a pH between 6.5 and 8.5 during the course of the polymerization, thereby producing a polymer in at least about 80% yield, and separating said polymer as product.

6. The process which comprises polymerizing a member of the group consisting of chlorotrifluoroethylene and mixtures containing chlorotrifluoroethylene and up to about 50% by weight of vinylidene fluoride in an aqueous suspension medium consisting essentially of water, an alkali metal perphosphate and a water-soluble reducing agent selected from the group consisting of bisulfites, hydrosulfites, sulfides, thiosulfates, hydrazine and hydroxylamine, at a temperature of about 0° to about 50° C. for a period of at least about 3½ hours, maintaining said aqueous suspension medium at a pH between 6.5 and 8.5 during the course of the polymerization, thereby producing a polymer in at least about 80% yield, and separating said polymer as product.

7. The process which comprises polymerizing a member of the group consisting of chlorotrifluoroethylene and mixtures containing chlorotrifluoroethylene and up to about 50% by weight of vinylidene fluoride in an aqueous suspension medium consisting essentially of water, potassium perphosphate and a water-soluble bisulfite, at a temperature of about 25° to about 35° C. for a period of at least about 3½ hours, maintaining said aqueous suspension medium at a pH between 6.5 and 8.5 during the course of the polymerization, thereby producing a polymer in at least about 80% yield, and separating said polymer as product.

8. The process which comprises polymerizing chlorotrifluoroethylene in an aqueous suspension medium consisting essentially of water, potassium perphosphate and sodium bisulfite, at a temperature of about 25° to 35° C. for a period of at least about 3½ hours, maintaining said aqueous suspension medium at a pH between 6.5 and 8.5 during the course of the polymerization, thereby producing a polymer in at least about 80% yield, and separating said polymer as product.

9. The process which comprises polymerizing a mixture containing chlorotrifluoroethylene and less than 10% by weight of vinylidene fluoride in an aqueous suspension medium consisting essentially of water, potassium perphosphate and sodium bisulfite, at a temperature of about 25° to 35° C. for a period of at least about 3½ hours, maintaining said aqueous suspension medium at a pH between 6.5 and 8.5 during the course of the polymerization, thereby producing a polymer in at least about 80% yield, and separating said polymer as product.

References Cited in the file of this patent

UNITED STATES PATENTS

| | | |
|---|---|---|
| 2,479,367 | Joyce et al. | Aug. 16, 1949 |
| 2,569,524 | Hamilton | Oct. 2, 1951 |
| 2,783,219 | Passino et al. | Feb. 26, 1957 |
| 2,837,505 | Dittman et al. | June 3, 1958 |
| 2,874,152 | Bolstad | Feb. 17, 1959 |